United States Patent [19]

Ahn

[11] 4,415,055
[45] Nov. 15, 1983

[54] TRACKED VEHICLE

[76] Inventor: Min H. Ahn, 5111 Maple Rd., Richmond, British Columbia, Canada

[21] Appl. No.: 289,024

[22] Filed: Aug. 3, 1981

[51] Int. Cl.³ ............................................. B62D 55/08
[52] U.S. Cl. .................................. 180/198; 180/9.2 R
[58] Field of Search .................... 180/198, 9.21, 9.26, 180/6.7; 305/15, 20

[56] References Cited

U.S. PATENT DOCUMENTS

| | | | |
|---|---|---|---|
| 2,282,745 | 5/1942 | Preston | 305/20 |
| 3,863,726 | 2/1975 | O'Brien et al. | 180/9.21 |
| 3,926,272 | 12/1975 | Weber | 180/6.7 |

*Primary Examiner*—Joseph F. Peters, Jr.
*Assistant Examiner*—Donn McGiehan
*Attorney, Agent, or Firm*—Townsend and Townsend

[57] ABSTRACT

A tracked vehicle to receive a wheeled vehicle and to be driven by the wheeled vehicle. The tracked vehicle has a chassis. Guide wheels are mounted on the chassis at each side and drive wheels mounted at at least the rear of the chassis, at each side. A track at each side of the vehicle is driven by the driven wheels and guided by the guide wheels. Drive members are attached to each drive wheel to receive a drive transmission. The chassis can receive and retain the wheeled vehicle further drive members are attachable to the driven wheels of the wheeled vehicle to receive the drive transmission so that driving of the driven wheels of the wheeled vehicle drives the tracks of the tracked vehicle.

7 Claims, 11 Drawing Figures

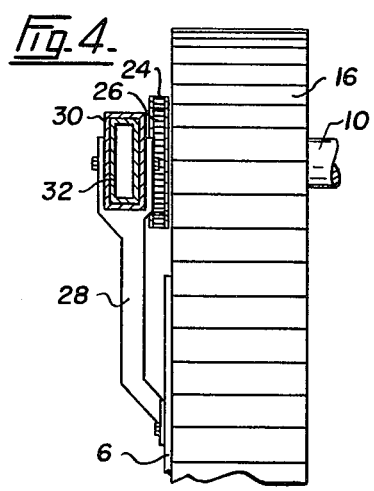
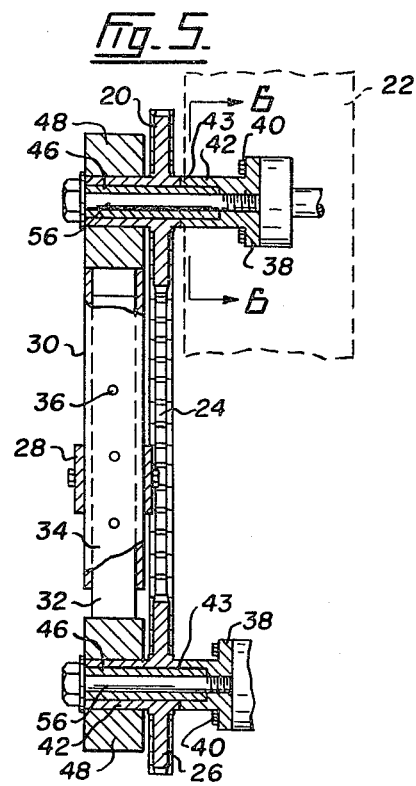
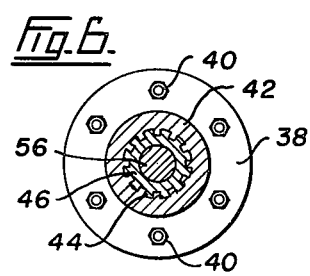
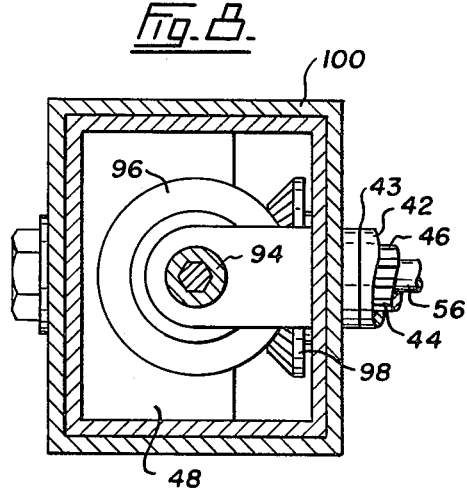
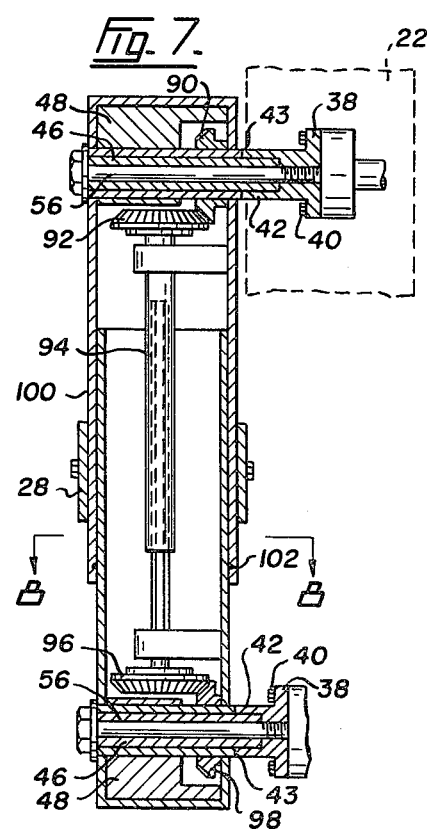

TRACKED VEHICLE

FIELD OF THE INVENTION

This invention relates to a tracked vehicle to receive a wheeled vehicle and to be driven by the wheeled vehicle.

DESCRIPTION OF THE PRIOR ART

In muddy conditions, for example in farms, wheeled vehicles often have considerable difficulties. No matter how large the wheels there is always a chance of slipping. Tracked vehicles represent the best form of traction available but, of course, a fully tracked vehicle, for example a bulldozer or the like, is an expensive item and is also a heavy item. This heaviness can be undesirable as damage to the soil structure can result by driving excessively heavy vehicles on the soil.

SUMMARY OF THE INVENTION

The present invention seeks to provide a tracked vehicle that is light in weight and does not have independent drive means of its own. Instead the tracked vehicle is adapted to receive a conventional road vehicle, for example a truck, so that the tracked vehicle may be driven in mud providing the advantages of the excellent traction of tracked vehicles with relative cheapness.

Accordingly, the present invention is a tracked vehicle to receive a wheeled vehicle and to be driven by the wheeled vehicle, the tracked vehicle comprising: a chassis; guide wheels mounted on the chassis at each side; drive wheel mounted at at least the rear of the chassis, at each side; a track at each side of the vehicle driven by the drive wheels and guided by the guide wheels; a drive member attached to each drive wheel; said drive member to receive drive transmission means; a chassis being adapted to receive and retain the wheeled vehicle; and drive means attaching to the driven wheels of the wheeled vehicle to receive said drive transmission means whereby driving of the driven wheels of the wheeled vehicle drives the tracks of the tracked vehicle.

BRIEF DESCRIPTION OF THE DRAWINGS

Aspects of the invention are illustrated in the accompanying drawings, in which:

FIG. 4 is a view on the line 4—4 in FIG. 2;

FIG. 5 is a detail along the line 5—5 in FIG. 2;

FIG. 6 is a detail along the line 6—6 in FIG. 5;

FIG. 7 illustrates a modification similar to the view of FIG. 5;

FIG. 8 is a section along the line 8—8 in FIG. 7;

DESCRIPTION OF THE PREFERRED EMBODIMENTS

Figure 2:
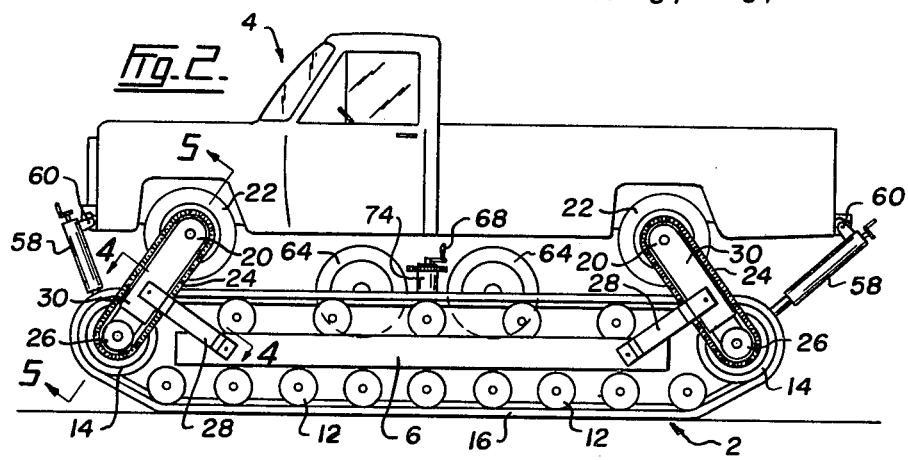
FIG. 2 is a side view of the tracked vehicle of the invention receiving and retaining a truck in position.
Figure 10:
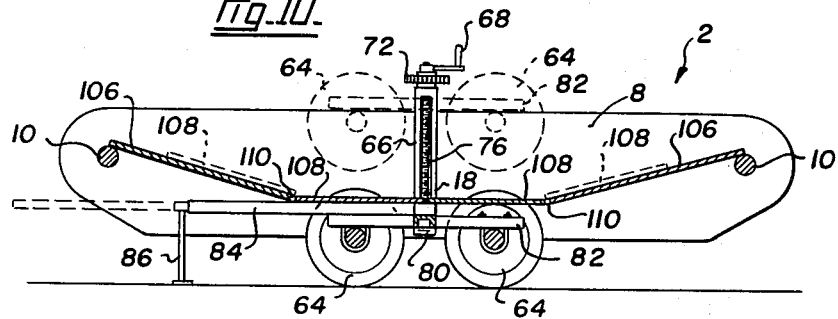
FIG. 10 is a further view of the tracked vehicle.

The drawings illustrate a tracked vehicle 2 to receive a wheeled vehicle 4 and to be driven by the wheeled vehicle 4. The tracked vehicle 2 comprises a chassis shown somewhat generally in the drawings but conventional for a tracked vehicle. For example the chassis includes a guide member 6 as shown in FIG. 2, side plates 8, one of which is shown in FIG. 10 and axles 10. There are guide wheels 12 mounted on the chassis at each side and drive wheels 14, in the illustrated embodiment mounted two at the rear and two at the front of the chasssis. There is a track 16 at each side driven by the drive wheels 14 and guided by the guide wheels 12 and a frame member 18 that also comprises part of the chassis of the tracked vehicle 2.

In the embodiment illustrated in FIGS. 1 to 6 there are first drive members in the form of sprockets 20 attachable to each drive wheel 22 of the road vehicle 4. A drive transmission means in the form of a chain 24 extends around the sprockets 20. There are second sprockets 26 attachable to the driven wheels 14 of the tracked vehicle 2, in this case all wheels since it is a four wheel drive vehicle, to receive the chain 24. The arrangement is such that driving of the driven wheels 22 of wheeled vehicle 4 drives the tracks 16 of the tracked vehicle 2. To attach the chain drive system arms 28 extend upwardly from the guide members 6 to engage a chain support member 30. Chain support member 30, as shown particularly in FIG. 5, is made of an inner part 32 and outer part 34 which are extendable and can be locked by the insertion of locking means in the holes 36 shown in FIG. 5. As shown particularly in FIG. 5 the drive is by the provision of an adapter plate 38 attachable to the road vehicle by using the wheel nuts 40, if necessary extended wheel studs may be used. A tubular member 42 split at 43 extends outwardly and receives sprocket 20. The interior of the tubular member 42 is formed with splines 44 (see FIG. 6) and engage a splined shaft 46. The sprocket 20 rotates with the tubular member 42 which is housed within an end of guide member 48. Bolts 56 extend through the interior of splined shaft 46 to locate the arrangement in position. The arrangement is the same at the bottom end where the drive wheels are attached to the tubular member 42 to which the sprocket 26 is formed. The tubular member 42 extends into a housing at the bottom end of the guide member 34 and a bolt 56 secures the guide member 32 to the drive assembly.

Tubular member 42 is split at 43 so that the adaptors 38 can be left in place, that is permanently attached to the tracked vehicle 2. The tubular member 42 can be split at 43 by removing bolt 56 and shaft 46 from the road wheel hubs at vehicle 2. The attachment can then be pivoted about the tracked vehicle drive wheels 14 so as to be out of the way.

The chassis of the tracked vehicle is adapted to receive and retain the wheeled vehicle. This is preferably accomplished by screw jacks 58, two at each end of the vehicle. These screw jacks attach to brackets 60 at the front and rear of the road vehicle 4 and engage at 62 on the axles 10 of the tracked vehicle 2.

Figure 1:
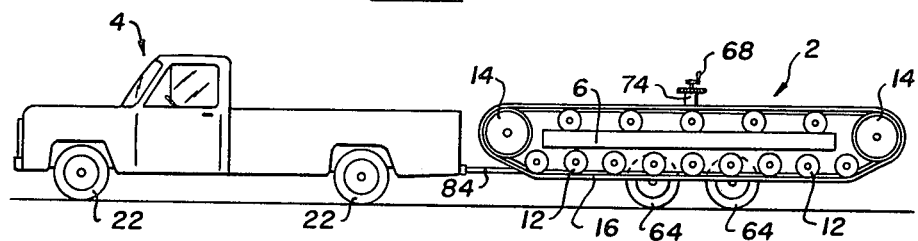
FIG. 1 is a side view of a tracked vehicle according to the present invention being towed by a truck.
Figure 9:
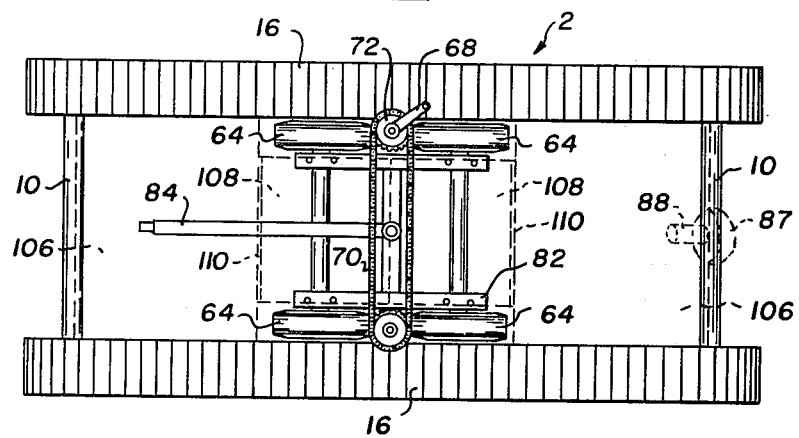
FIG. 9 is a partial plan view of a tractor vehicle according to the present invention.
Figure 11:
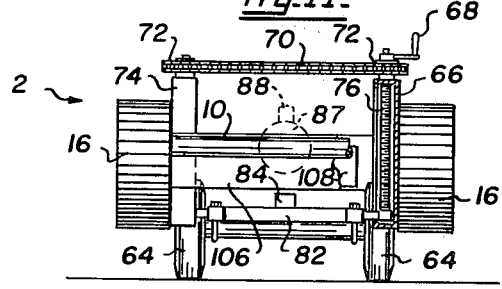
FIG. 11 is an end view of FIG. 10.

In the embodiment illustrated in FIG. 1 the tracked vehicle 2 is provided with road wheels 64 attached to the chassis of the tracked vehicle. There are means to raise and lower the road wheels and these comprise a jack 66 with handle 68, the arrangement being shown in most detail in FIG. 9 to 11. On rotation of jack handle 68 a chain 70 on sprockets 72 drive takes the rotation to a second jack 74 at the other side of the vehicle 2. The jacks are threaded shafts 76 located in a frame member 18 attached to the side plates 8 of the chassis of the tracked vehicle. The threaded shafts 76 engage in threaded openings 80 formed on the outsides of secondary chassis members 82 which are simply a means of locating the road wheels 64 of the tracked vehicle 2. FIGS. 9 to 11 also illustrate the presence of a tow bar 84, preferably extendable and extending from the secondary chassis 82 so that the vehicle 2 may be towed by the road vehicle 4 as shown in FIG. 1. The tow bar 84 is provided with a jack 86—see FIG. 10.

FIGS. 7 and 8 illustrate a variation of the drive transmission means as shown in FIGS. 4 and 5. In the embodiment of FIGS. 7 and 8 the hubs of the vehicle 4 are provided with a drive plate 38 to which is attached the arrangement shown in FIG. 5 except that sprocket 20 is replaced by a bevelled gear 90. That bevelled gear 90 engages a second bevelled gear 92 formed on a telescopic shaft 94. At the other end of the telescopic shaft 94 is a third bevelled gear 96 engaging a fourth bevelled gear 98 to transmit drive to the drive wheels 14 of the tracked vehicle 2. Desirably the shaft 94 and bevelled gears are located in a casing 100 filled with oil for lubrication of the gears and provided with oil seals at 102. The casing is located as the guide members 32 and 34 in FIG. 4. Again the casing is telescopic to permit variations in the position of the two vehicles 2 and 4.

Figure 3:
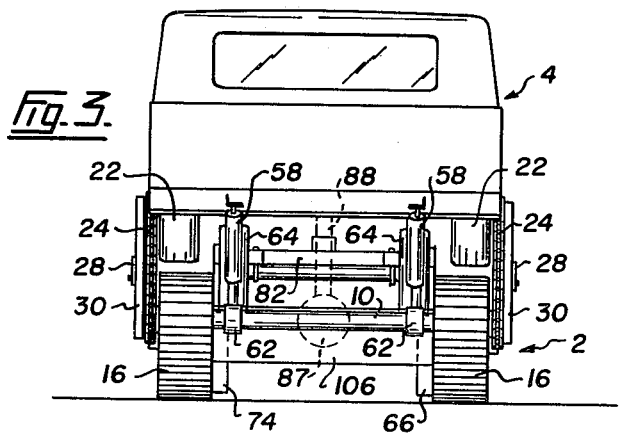
FIG. 3 is a rear view of a tracked vehicle with a truck in position.

FIG. 3, 9 and 11 show in broken lines, that a differential unit 87 may be installed in a back axle of vehicle 2. The propeller shaft 88 of the vehicle 4 is detached from the differential of vehicle 4 and attached to differential unit 87. This can be useful to simplify power transmission.

FIGS. 9 and 10 illustrate that the vehicle 2 may have a floor made of boards so that vehicle 2 may carry loads when it is towed as shown in FIG. 1. There are shaped end boards 106 and movable centre boards 108. Boards 108 are hingedly attached to boards 106 at 110 so that boards 106 can be moved to the broken line position shown in FIG. 10. This allows wheels 64 to be lifted. The boards are shown in broken lines in FIG. 9 so as not be obscure other details of the structure of vehicle 2. It should be noted that centre boards 106 have openings for wheels 64.

To use the present invention first the vehicle 2 may be towed to a site as shown in FIG. 1. It will be noted that rotation of the jack 66 has been carried out first so that the road wheels 64 extend down beneath the base of the track 16. The tow bar 84 is extended and the tracked vehicle 2 then towed to its required destination.

At that destination the road vehicle 4 is driven up a ramp onto the tracked vehicle 2. The bars 28 are attached along with the guide members. The adapter drive means 38 are attached to the driven wheels of the vehicle 4 and the drive wheel 14 of the tracked vehicle 2. The road wheels of the tracked vehicle are moved up by jack 66 so that the track 16 contacts the ground and the road wheels 64 are in the position shown in FIG. 2. The jacks 24 at the front and rear of the vehicle are attached to the axles of the tracked vehicle and to the brackets of the road vehicle as shown in FIGS. 2 and 3. The jacks 24 are operated to lift and move the road vehicle 4 to the correct position. When the correct position is achieved and correct tension is shown in the drive chains 24 then the guide members are locked into position by bolts extending through the openings 38 shown in FIG. 5. Starting the engine of the truck and engaging the transmission then transmits drive from the vehicles transmission to the drive wheels. The tracks are rotated and the vehicle thus moved along. To steer the vehicle braking means are provided on the drive wheels of the tracks. The braking means are desirably attached to a power take off of the power steering of the vehicle whereby turning of the wheel operates the braking system on one track to slow that track and thus turn the vehicle in the direction of that track, that is slowing of the left track turns the vehicle to the left slowing of the right track slows the vehicle to the right. This steering of tracked vehicles is well known in the art.

With a long vehicle it may be desirable to have wheels at the front of the chassis of tracked vehicle 2 and tracked only at the rear. Alternatively, a second small set of tracks, independently mounted from the main set, may be provided at the front of the vehicle.

A small auxiliary engine, may be provided in the tracked vehicle, with a drive shaft connected to the drive means of the vehicle. This auxiliary engine can be used to move the vehicle independently of the road vehicle for example should the road vehicle break down.

The present invention thus provides a relatively simple and relatively cheap tracked vehicle that can be operated with a truck available, for example, to any farmer.

I claim:

1. A tracked vehicle to receive a wheeled vehicle and to be driven by the wheeled vehicle, the tracked vehicle comprising;
   a chassis;
   guide wheels mounted on the chassis at each side;
   drive wheels mounted at at least the rear of the chassis, at each side;
   a track at each side of the vehicle driven by the drive wheels and guided by the guide wheels;
   first drive members attached to each drive wheel;
   said drive member being adapted to receive a drive transmission means;
   the chassis being adapted to receive and retain the wheeled vehicle by jacks contacting the front and rear of the wheeled vehicle and contacting the tracked vehicle; and
   second drive members attachable to the driven wheels of the wheeled vehicle to receive said drive transmission means whereby driving of the driven wheels of the wheeled vehicle drives the tracks of the tracked vehicle.

2. A tracked vehicle as claimed in claim 1 including road wheels attached to the chassis of the tracked vehicle;
   means to raise and lower the road wheels below the bottom level of the tracks so that the tracked vehicle may be towed on a road with the road wheels lowered.

3. A tracked vehicle as claimed in claim 1 having four drive wheels, two at the front and two at the rear, so that the vehicle may retain and be driven by a four wheeled drive vehicle.

4. A tracked vehicle as claimed in 1 with axles extending between the front and rear wheels of the tracked vehicle;
   said jacks extending from the axles to attach to the wheeled vehicle, adjustment of the jacks acting to locate the wheeled vehicle.

5. A tracked vehicle as claimed in claim 1 in which the drive transmission means comprises drive chains, the first drive member attached to each drive wheel is a sprocket and the drive transmission means attached to the driven wheels of the wheeled vehicle comprise sprockets, each sprocket engaging with a drive chain.

6. A tracked vehicle as claimed in claim 1 in which the drive transmission means is a drive shaft with bevelled gears at each end and in which the first and second drive members are further bevelled gears to engage said bevelled gears on the drive shaft.

7. A tracked vehicle as claimed in claim 1 including means to vary the length of the drive transmission means depending upon the relative positions of the tracked vehicle and the wheeled vehicle.

* * * * *